No. 683,298. Patented Sept. 24, 1901.
F. KRABAL.
MACHINE FOR FORMING AND PRINTING BUTTER CAKES.
(Application filed Dec. 6, 1900.)

(No Model.) 2 Sheets—Sheet 1.

Witnesses
J. L. Appleman
E. E. Potter

Inventor.
Frank Krabal.
By
H. C. Evert & Co.
Attys

No. 683,298. Patented Sept. 24, 1901.
F. KRABAL.
MACHINE FOR FORMING AND PRINTING BUTTER CAKES.
(Application filed Dec. 6, 1900.)
(No Model.) 2 Sheets—Sheet 2.
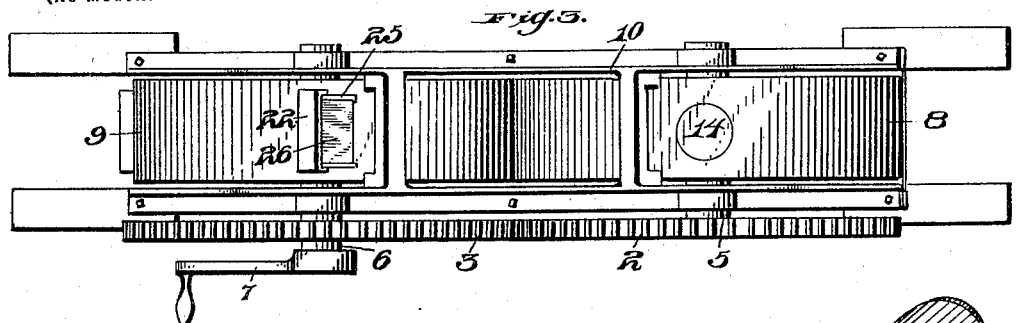
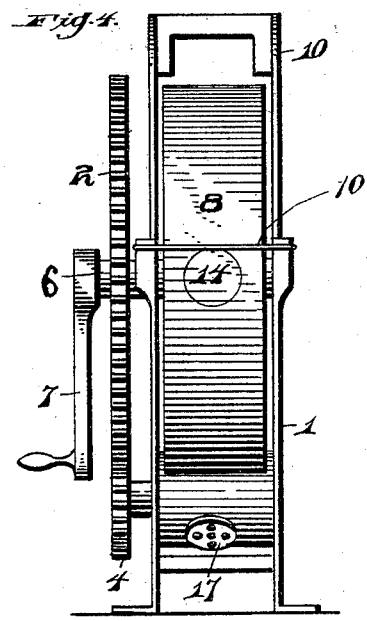
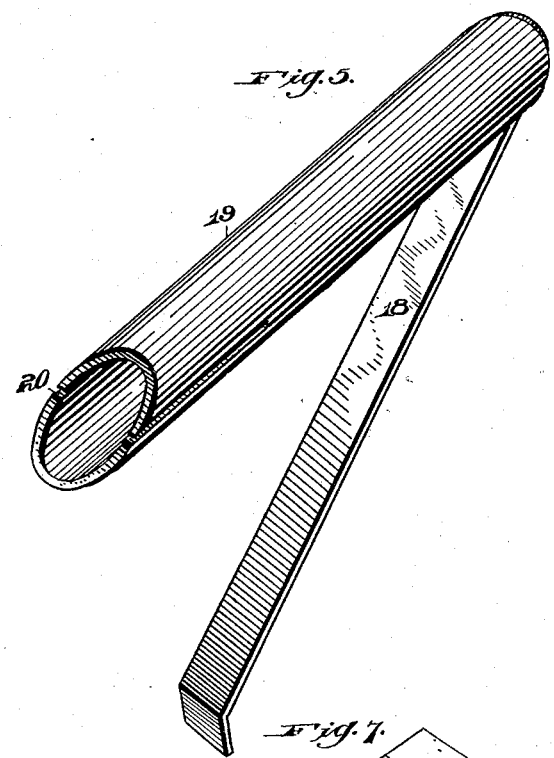
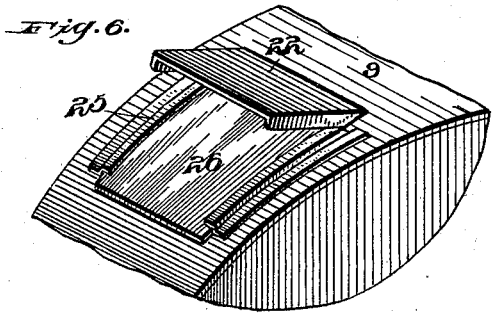
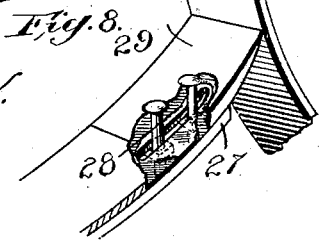
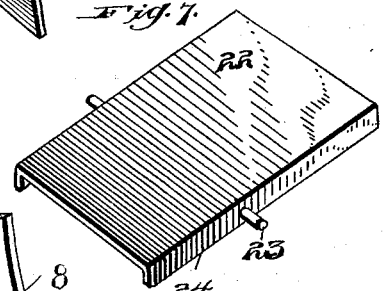
Witnesses:
J. P. Appleman
E. E. Potter
Inventor.
Frank Krabal.
By
N. C. Evert & Co.
Attys

UNITED STATES PATENT OFFICE.

FRANK KRABAL, OF PITTSBURG, PENNSYLVANIA.

MACHINE FOR FORMING AND PRINTING BUTTER CAKES.

SPECIFICATION forming part of Letters Patent No. 683,298, dated September 24, 1901.

Application filed December 6, 1900. Serial No. 38,942. (No model.)

*To all whom it may concern:*

Be it known that I, FRANK KRABAL, a citizen of the United States of America, residing at Pittsburg, in the county of Allegheny and State of Pennsylvania, have invented certain new and useful Improvements in Machines for Forming and Printing Butter Cakes, of which the following is a specification, reference being had therein to the accompanying drawings.

This invention relates to certain new and useful improvements in machines for forming and printing butter cakes, and has for its object the provision of novel means whereby a large quantity of butter may be easily formed into small cakes.

The invention consists in the novel combination, arrangement, and construction of parts to be hereinafter more fully described, and specifically pointed out in the claims.

In describing the invention in detail reference is had to the accompanying drawings, forming a part of this specification, wherein like numerals of reference indicate corresponding parts throughout the several views, and in which—

Figure 1:
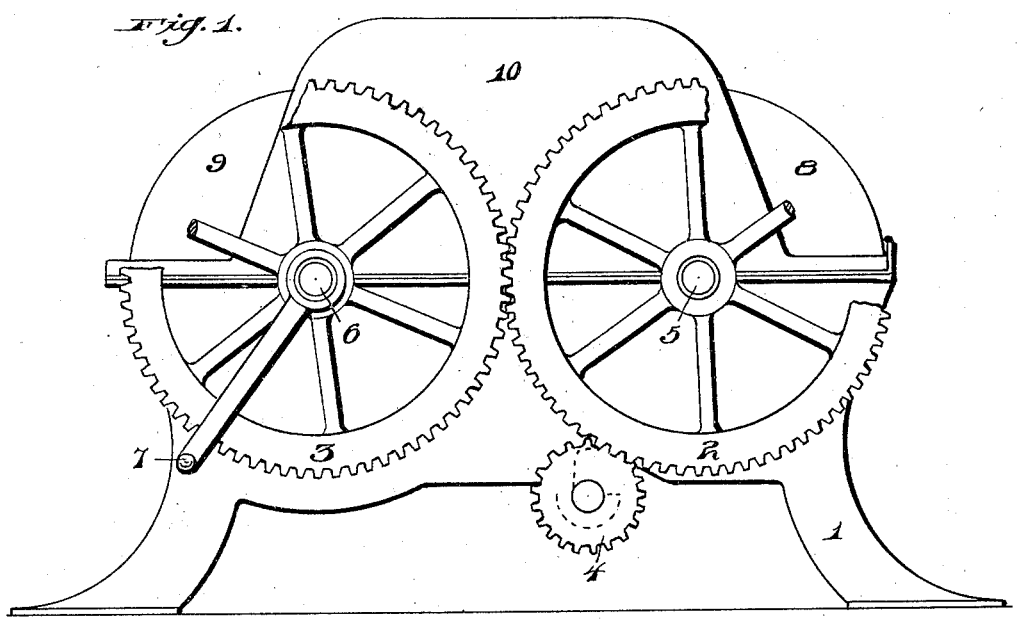
Figure 2:
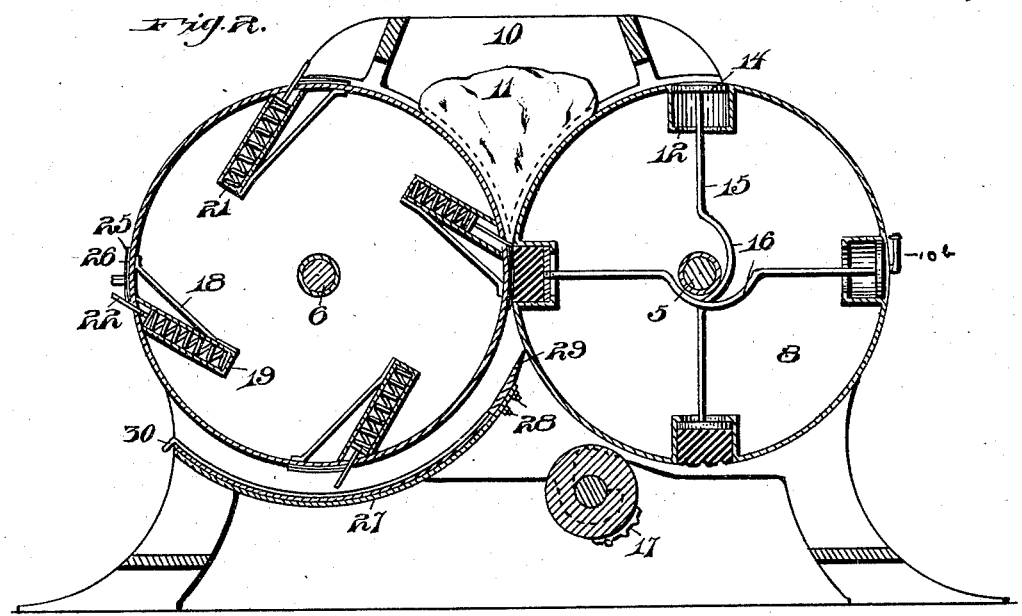

Figure 1 is a side elevation of my improved machine for forming butter cakes. Fig. 2 is a vertical sectional view thereof. Fig. 3 is a top plan view of the same. Fig. 4 is an end elevation thereof. Fig. 5 is an enlarged perspective view of one of the tubular casings carrying the scraper. Fig. 6 is a perspective view of a portion of one of the wheels, showing the scraper. Fig. 7 is a perspective view of the scraper detached. Fig. 8 is a detail perspective view, broken away and showing the adjustability of the scraper.

In the drawings, the reference-numeral 1 indicates a suitable frame upon which are rotatably mounted cog-wheels 2 and 3, which are adapted to mesh with one another and are of equal size.

The reference-numeral 4 indicates a cog-wheel meshing with the cog-wheel 2, the latter being suitably mounted upon the frame. Said cog-wheels 2 and 3 are mounted upon shafts 5 and 6, respectively. To said shaft 6 is attached a crank-handle 7. The said cog-wheel 2 carries a drum 8, and a similar drum 9 is carried by the cog-wheel 3. A handle-hopper 10 is arranged between the upper faces of the drums 8 9 for the reception of the butter 11.

The reference-numeral $10^b$ represents a wire scraper, which is adapted to scrape the butter from the face of the head 14.

The reference-numeral 12 indicates a series of tubular casings arranged in the drum 8, said tubular casings having slidably secured therein heads 14, connected by rods 15, having curved central portions 16 to allow the same to pass the shaft 5. Four of said casings 12, with a corresponding number of heads, are preferably arranged in the drum 8, carrying one set of rods 15. The rods and heads are arranged in such a manner in the tubular casings 12 that when the head of one side is flush with the periphery of the drum the corresponding head of the other side will be moved inwardly to the extreme limit of the interior wall of the tubular casing.

The reference-numeral 17, Fig. 4, represents a print arranged upon and rotated by the cog-wheel 4, the latter being one-fourth the size of the cog-wheels 2 and 3, and is adapted to make four revolutions to one revolution of the cog-wheels 2 and 3, the print 17 being adapted to engage the face of the butter cake as the same is revolved and formed.

The reference-numeral 18 represents braces arranged in the interior of the drum 9, carrying a tubular casing 19, said tubular casing having formed therein slots 20. Spiral springs 21 are arranged in said tubular casing and serve to actuate the spring-pressed scraper 22, said spring-pressed scraper carrying outwardly-extending lugs 23, Fig. 7, which are adapted to ride in the slots 20 of the tubular casing 19. The said scraper 22 carries downwardly-extending sides 24, the latter being formed integral therewith and extending at right angles to the body portion of the scraper.

The reference-numeral 25 represents guides arranged in close proximity to the scraper upon the periphery of the drum 9 for the purpose of receiving veneered strips of wood 26, providing a smooth surface for the butter, that will prevent same from sticking to the drum when the butter is forced into the openings arranged in the opposite drum. A semicircular shield 27, having a slot formed near one end thereof, is arranged below the drum 9, to which is adjustably secured, by means of bolts and nuts 28, a scraper 29, adapted to come into contact with the periphery of the drum 8. A semicircular slide 30, operating in suitable guides, is arranged in the semicircular shield 27 and may be easily removed therefrom when the occasion requires, when the small particles of butter are removed from the periphery of the drum 8 by means of the scraper 29.

The operation of my improved machine is as follows: The crank-handle is rotated, thereby communicating movement to the drums 8 and 9 and cog-wheel 4. As the drum 9 is rotated the scraper will engage the butter and force the same into the casings 12, arranged in the opposite drum 8. As the scraper engages the periphery of the drum 8 the same will be depressed and as the point is rotated force the butter into the openings. As the same is further revolved the prints 17 will engage the surface and print thereon any desired design. The drum 8 is then further revolved until the cakes of butter have made one-half a revolution in the drum, where they will be forced out through the medium of the head 14, the head 14 being connected to the head directly opposite the same by means of the stem 15. Thus when the incoming butter depresses the head 14 the head opposite will be forced out, carrying with it the butter. The operation in this manner is repeated, and a large number of cakes may be printed in a comparatively short time, said operation being an extremely simple and rapid one. It will be noted that all the parts may be easily removed and cleaned when desired, thereby preventing the machine from becoming soured, which is a very objectionable feature in machines of this class.

It will be noted that various changes may be made in the details of construction without departing from the general spirit of my invention.

Having thus fully described my invention, what I claim as new, and desire to secure by Letters Patent, is—

1. In a machine of the character described, the combination of two revoluble drums, tubular casings arranged in said drums, opposite heads arranged in the casing of one of said drums and connecting-rods between the opposite head and spring-pressed scrapers arranged in the casings of the other of said drums, substantially as described.

2. In a machine of the character described, the combination of a suitable frame, cog-wheels mounted on said frame, drums rotating in opposite directions on said cog-wheels, tubular casings arranged oppositely in said drums, a head in each of the tubular casings in one of said drums, a rod connecting the opposite heads, spring-pressed scrapers arranged in the casings of the other drum, a hopper arranged between said drums, a print-roll operating in contact with the first-named drum, and a cog-wheel on the print-roll meshing with one of said cog-wheels, substantially as described.

3. In a machine of the character described, the combination of a suitable frame, cog-wheels mounted on said frame, drums arranged to said cog-wheels operating in opposite directions, tubular casings secured in said drums, heads secured in the casings of one of the said drums, connecting-rods secured to said heads, spring-pressed scrapers arranged in the casings of the opposite drum, a hopper attached between said drums, a cog-wheel meshing with one of said cog-wheels, a print-roll operated by the last-named cog-wheel, a semicircular shield arranged under one of said drums, and an adjustable slide and scraper all parts being arranged and operating for the purpose herein set forth.

In testimony whereof I affix my signature in the presence of two witnesses.

FRANK KRABAL.

Witnesses:
  JOHN NOLAND,
  E. E. POTTER.